April 21, 1942.  G. F. BAHR  2,280,052
SHAVING MACHINE
Filed Feb. 26, 1938
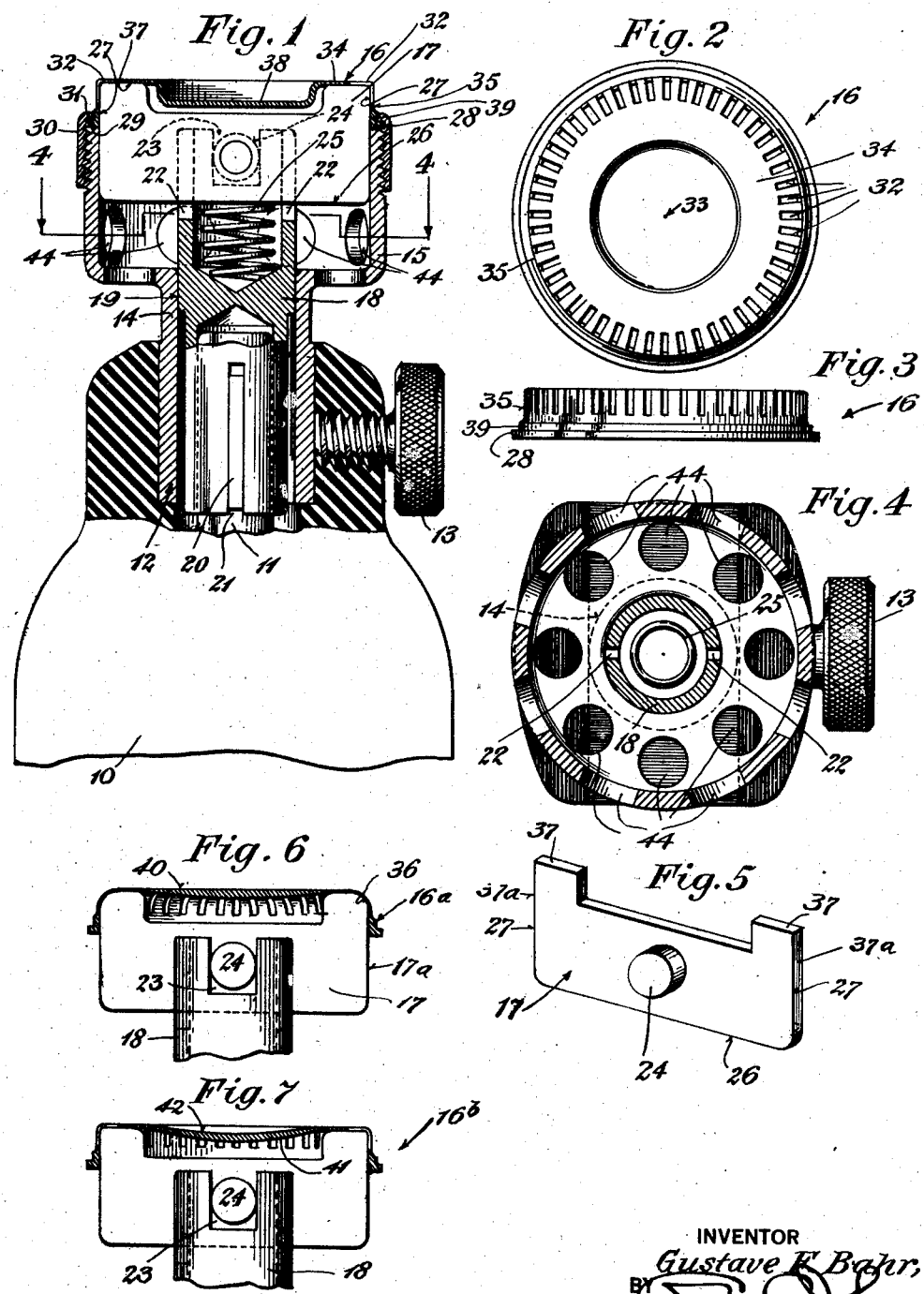
INVENTOR
Gustave F. Bahr,
BY
ATTORNEY Patented Apr. 21, 1942

2,280,052

UNITED STATES PATENT OFFICE 2,280,052

SHAVING MACHINE

Gustave F. Bahr, Fairfield, Conn., assignor to Casco Products Corporation, Bridgeport, Conn., a corporation of Connecticut Application February 26, 1938, Serial No. 192,765

6 Claims. (Cl. 30—43)

This invention relates to electric shaving machines for personal use.

An object of the present invention is the provision of an electric shaver which will shave clean and rapidly, and which will cut long hairs as well as short stubby hairs without pulling.

In common with most shaving machines as heretofore proposed, the device of the present invention cuts the hair presented to it by a shearing action between a fixed and movable cutter, the fixed cutter being on the outside and being brought in direct engagement with the skin and being apertured to permit the hairs to extend to the interior of the device where they come in contact with the movable cutter and are sheared off by coaction between an edge of the movable cutter and the edge of a wall of an aperture in the fixed cutter.

In most prior proposals, the movable cutter has been in the form of a reciprocating or oscillating member bearing against the under surface of the fixed cutter or guard. Such reciprocating or oscillating cutting members cannot operate at constant speed, for they must, of necessity, slow down and stop, and then reverse in changing their direction of movement. Hence, the period of time during which the movable cutter or blade is operative is limited. Speed is a factor in all cutting operations, and since the speed of a reciprocating or oscillating cutter cannot be constant, it is not possible to operate such a cutter at the most efficient speed.

According to the present invention, the movable cutter is mounted for rotation, and hence may be operated at the most efficient speed for cutting operations. Since there is no necessity for slowing down, stopping and reversing, the rotary cutter of the present invention may be brought up to much higher cutting speeds than the reciprocating or oscillating type cutter.

Rotary movable cutters have also been previously proposed, but, in these previous proposals, the stationary cutter or guard member was either perforated with round holes or slotted with the slots extending all in one direction. In the case of a shaving machine having round holes through which the hair extends, the angle between the edge of the hole and the rotary shearing blade cooperating therewith could not be maintained constant—the shearing angle varied according to the location of the hair in the hole.

In the case of the shaving machine with the rotary blade and parallel hair-receiving slots, there are slots which the cutter extends across and slots which are parallel with the path of the cutter. As a result, the shearing angle between each slot and the cutter is different, and there is no shearing action between the movable cutter and the stationary cutter or guard in those slots or the portions thereof which are more or less tangent to the path of rotation of the various parts of the cutting blade, and hence it was proposed to provide such a movable cutter with a keen edge to cut the hair rather than to shear it off.

According to the present invention, no cutting of the hair other than by shearing is accomplished, and the hair-receiving slots in the stationary cutter are radial with the movable cutter rotating about an axis coincident with a point from which the slots radiate. Hence, the shearing angle, in a device according to the present invention, is constant and uniform. This constancy in the cutting angle, coupled with the ability to maintain constant speed, enables the selection and maintenance of the most advantageous conditions for cutting the hair.

The angle of shear may be anything desired and determined by the thickness of the cutting blade, but, in any event, the angle is preferably very small, and hence the blade is preferably made relatively thin.

By having the slots in the stationary cutting member radially disposed in a disk-like or circular form and near or at the periphery of the disk, a cutting surface of larger area is provided while yet having a comparatively small head, for the length of the cutting area is about three and one-seventh times the diameter of the head. When such a shaving machine head is presented to the hair-containing skin, a large quantity of the hair projects through the radial slots, and this, coupled with the fact that the movable blade may be moved very rapidly, reduces the time required to shave.

By having the head in the form of a disk with the radial slots, the device becomes non-directional, that is to say, the head may be moved over the skin in any direction at all, and even with a rotary movement, which I have found to be quite satisfactory.

With shaving machines heretofore proposed having parallel slots with a reciprocating or oscillating cutter, experience has shown that, for satisfactory results, the path of movement of the head over the skin must be substantially parallel to the slots, and it is difficult, therefore, to shave hair from some parts of the face and many parts of the body with this motion of the shaving machine.

In attempting to shave long hairs, another difficulty is encountered with shaving machines of the reciprocating or oscillating type, for long hairs, which are usually finer than the stubble-like hairs on a man's face, are caught between the reciprocating or oscillating cutter and the fixed cutter or guard, with the result that pulling of the hairs is experienced.

With the device of the present invention, which may be used with substantially the same motion as a brush in painting, the shearing angle between the fixed and movable cutter being constant and the cutting speed relatively high, long, fine hairs are cut with great rapidity and without experiencing any pulling of the hairs.

One of the advantageous features of the present invention is the simplicity of the device, its ruggedness, and the ease with which it may be cleaned, as well as the fact that it may be accurately manufactured in quantities at a comparatively low cost.

Other features and advantages will hereinafter appear.

In the accompanying drawing, which illustrates several embodiments of this invention—

Figure 1 is a sectional view of the head of the shaving device of the present invention, showing the same attached to a conventional form of handle and motor casing.

Fig. 2 is a top plan view of the stationary cutter or guard shown in Fig. 1.

Fig. 3 is an elevation of the guard shown in Fig. 2.

Fig. 4 is a top plan view taken on the line 4—4 of Fig. 1, showing the casing of the head and part of the driving means.

Fig. 5 is a perspective view of the movable cutter blade.

Fig. 6 shows a modification of the present invention, wherein the portion between the face and the periphery of the cutter is rounded, this portion being also the radially slotted portion.

Fig. 7 shows another modification of this invention.

As shown in the accompanying drawing, the shaving machine of the present invention includes any suitable form of handle 10 and driving motor having a drive shaft 11 rotated at the desired speed. The shaving head has any desirable or suitable base member 12 removably secured to the handle as by a thumb screw 13.

The base 12 has a preferably tubular shank 14 which may be formed integral with a circular casing 15, carrying a stationary cutter member 16 and containing within it a movable cutter member or blade 17.

The shank 14, in the form of the invention herein disclosed, has a cylindrical bore to receive a stub shaft 18 and support the same for rotation on bearing surfaces 19. The inner end of the stub shaft is hollow and slides over the drive shaft 11 to which it is keyed in any suitable way as by the spline 20 and slot 21 in the stub shaft. The top portion of the stub shaft has diametrical slots 22 to snugly fit and slidably mount the rotary cutting blade 17. It has another slot 23 to receive a pin 24 on the cutting blade which centers the blade on the stub shaft against radial movement. The upper end of the stub shaft 18 is hollow and contains a spring 25 which bears against the bottom edge 26 of the cutting blade and tends to move the blade upwardly as viewed in Fig. 1, that is to say, in the direction of the fixed cutter 16.

It will be noted that the cutting blade 17 is supported on edge in the casing 15 and has its side edges 27 close to the internal walls of the casing 15 but not necessarily bearing thereon.

The stationary cutting member 16 may, if desired, be threaded on or otherwise directly secured to the casing 15. However, since the cutting member 16 should be made of good steel so as to be long wearing, it is preferable, as shown in the accompanying drawing, to make the cutting member 16 separate from the means which secures it to the casing. For this purpose, the cutting member 16 is provided with an annular flange 28 which rests on the upper edge 29 of the casing and is in position to be clamped thereto by a screw threaded ring 30 having a flange 31 engaging the flange 28. This construction also facilitates the removal of the fixed cutting member without torsional strains thereon, for it is merely necessary to unscrew the ring 30 alone to remove the ring and cutter 16 and then remove the rotating cutter 17.

As above stated, the fixed cutter, according to the present invention, is provided with radial hair-receiving slots 32 extending therethrough. These slots are comparatively narrow and are closely spaced, the spacing being that which gives sufficient rigidity to the fixed cutter, considering its thinness. The slots are also relatively short and extend substantially radially of the point 33 which is substantially coaxial with the axis of rotation of the stub shaft 18.

The slots 32 may be located solely in the face 34 of the fixed cutter, but, preferably, they are not only in the face but they are at the peripheral margin of the circular cutter and extend down through the periphery 35 of the cutter so that hairs, especially longer ones, may enter the slots from the side of the cutter and need not, of necessity, enter the slots only from the face of the cutter. Preferably, the edge, formed by the junction of the face 34 of the cutter with the periphery 35, is not sharp and may be slightly rounded, as in the form of the invention shown in Figs. 1, 2, 3 and 7, or, it may be substantially rounded as in the cutter 16a shown in Fig. 6.

With the form of the invention shown in Fig. 1, it is intended that the fixed cutter 16 contact with the hair-containing skin substantially flat against the skin, but, with the form of the invention shown in Fig. 6, the cutter 16a may be applied in this way or with the rounded edge 36 resting against the skin. The rotating cutting blade 17, being urged outwardly by the spring 25, slides along the internal surface of the slotted portion, at least, of the cutter 16 and shears off hairs which extend through the slots. The outer portions of the blade 17 are of course shaped to fit the contour of the portion of the cutter 16 which it engages, so that there will be a hair-shearing fit between the cutter 17 and the cutter 16. For instance, in the form shown in Fig. 6, the outer edges 17a of the cutter 17 are rounded to conform to the rounded portions 36 of the fixed cutter.

When used flat against the skin as intended, an annular swath of hair is cut simultaneously and the area of this swath is relatively large considering the shaving machines as previously manufactured, because the slots are arranged in an annular series having an effective length, over three times the overall dimensions of the cutter. Also, by having the slots radially disposed, as pointed out above, the device is nondirectional and may be advanced over the skin in any direction, suiting the convenience of the user, and, in fact, may be moved over the skin with a rotary motion which I have found to be a very satisfactory way of using the device.

Also, by having the slots radial, the shearing angle between the interior edges of the walls of the slots and the upper edges 37 of the rotating blade 17 is constant and uniform for all slots.

It is desirable that the shearing angle between the fixed cutting member 16 and the movable cutting member 17 be a rather small one, and, hence, the cutting blade 17 is preferably made thin, for the thicker the blade the less radial the cutting edges 37 become and the greater the angle between them and the radial slots.

Preferably, the slotted portion of the cutter 16 is very thin so that the hair will be sheared-off close to the skin. However, the other parts of the cutter 16 may be as thick as required for sufficient strength. In the form of the invention shown in Fig. 1, the fixed cutter 16 is provided with a circular depression 38, the side walls and bottom of which are substantially thicker than the slotted portions of the cutter. Likewise, the periphery of the cutter in the vicinity of the flange 28 may be enlarged as at 39. The dished portion permits the annular margin of the fixed cutter 16 to be pressed against the skin. However, it is not essential or necessary that there be this dish portion, for, as shown in Fig. 6, the top of the cutter 16a may be substantially flat as at 40 while the inner portion may be convex, so as to cause the portion of the cutter between the slotted portions to gradually increase in thickness toward the center and thus act as a truss to sustain the shape of the cutter.

Again, as shown in Fig. 7, the internal surface 41 of the cutter 16b may be convex while the external portion 42 is concave, and the curvatures of these surfaces are preferably such that the central portion 43 of the cutter is substantially thicker than the slotted marginal portions.

In making the device, the fixed cutter may be made from stamped and formed hard sheet steel, or it may be made from solid stock as in a screw machine. In either event, the internal and external surfaces of the cutter adjacent the slotted portions thereof are ground, and these, especially in the form of the invention shown in Fig. 1, being substantially flat, the grinding operation may be performed with comparative ease. Likewise, with the rotary cutter 17, it may be made by blanking out a piece of metal of desired shape and then grinding the edges 37 and 37a.

From what has preceded, it will be seen that the hair may enter the slots 32 from any angle and that the rotating cutter 17 may be rotated at high speed, shearing the hairs off rapidly without opportunity for the hairs to be pulled in between the undersurface of the fixed cutter 16 and the top surface of the rotating cutter 17, which would result in pulling the hairs. The cutter 17, being diametrically disposed within the head, has two sets of cutting surfaces, one at each side, and hence, twice as many cutting operations may be performed without throwing the device out of balance. The cutter 17, being symmetrical and having its axis of rotation midway between its faces, may operate with equal facility regardless of whether it is rotating clockwise or counterclockwise and the shearing angle between the surfaces 37 and the corners of the teeth is the same regardless of the direction of rotation of the movable cutter 17.

To permit sheared off hair to fall through the casing 15, and also to ventilate the same, the casing is provided with suitable apertures 44.

Due to the edgewise disposition of the movable blade against the fixed cutter and due to the fact that there are just two narrow portions thereof which engage the fixed cutter, there is very little friction developed in the device between the fixed cutter and the movable cutter, and the tendency of the head to heat in operation is reduced. Besides, the slots are, for the most time, open to the reception of the hair, and it is only when the narrow blade sweeps by the slot that it is momentarily closed against passage of hair.

With the device of the present invention, there will not be an accumulation of moisture between the fixed and movable cutters as in common types of shaving machines, because any moisture on the face, as for instance, perspiration, if it reaches the movable cutter at all will be quickly evaporated, for the cutting blade itself maintains a constant circulation of air within the head.

Variations and modifications may be made within the scope of this invention and portions of the improvements may be used without others.

I claim:

1. In a dry shaving device, a casing; a removable cutter head having radial hair-receiving apertures therein mounted on the casing; a drive shaft in the casing; a cutter member having a plurality of cutting surfaces; and means for coupling the cutter member to the drive shaft for rotation therewith, said means including a substantially cylindrical member, said cylindrical member having a socket at each end thereof, one socket receiving the end of the drive shaft, the socket formed at the opposite end having its wall formed with diametrically opposed slots for receiving the cutter member, a spring disposed within said last-named socket and acting against said cutter member and urging the shearing surfaces thereof into engagement with the undersurface of the cutter head to cooperate with the same to sever hairs extending through the hair-receiving apertures therein.

2. In a dry shaving device, a casing; a removable cutter head having radial hair-receiving apertures therein mounted on the casing; a drive shaft in the casing; a cutter member having a plurality of cutting surfaces; means for coupling the cutter member to the drive shaft for rotation therewith, said means including a substantially cylindrical member, said cylindrical member having a socket at each end thereof, one socket receiving the end of the drive shaft, the socket formed at the opposite end receiving a spring and having its wall formed with diametrically opposed slots for receiving the cutter member; and means for mounting said cutter member in said slots for movement about an axis perpendicular to the axis of rotation of said shaft, said spring acting against said cutter member and urging the shearing surfaces thereof into engagement with the undersurface of the cutter head to cooperate with the same to sever hairs extending through the hair-receiving apertures therein.

3. In a dry shaving device, a casing; a removable cutter head having radial hair-receiving apertures therein mounted in the casing; a drive shaft in the casing; a cutter member having a plurality of cutting surfaces; means for coupling the cutter member to the drive shaft for rotation therewith, said means including removable means sleeving said drive shaft and forming a hollow extension of said drive shaft, said cutter member being connected to rotate with said coupling means by a pivot member whose axis is transverse to said shaft, said pivot member and cutter member being movable axially of the shaft; and a spring carried within said hollow extension and acting against said cutter member to urge the same axially of said shaft to hold the cutting surfaces therein in engagement with the surface of said cutter head.

4. A shaving mechanism including a power driven rotatable shaft; a cutter member having cutting edges extending radially to each side of an end of said shaft; means for coupling said cutter member to the shaft for rotation therewith, said means including a coupling member having one end sleeving said drive shaft, the opposite end being formed with a radially extending slot receiving said cutter member and with a second slot transverse to said radial slot; a pivot member carried by said cutter member and received within said second slot, the pivot member being shiftable axially of the shaft and pivotable about an axis transverse to said shaft; and a cutter head having radial hair-receiving slots therein and cooperating with the cutting edges of the cutting member to shear off hair extending through said slots.

5. A shaving machine comprising a head having a series of radial, narrow and closely spaced hair-receiving slots extending therethrough; a rotatable blade having shearing surfaces in contact with the undersurface of the head and cooperating with the interior edges of the walls of the slots to shear off hair extending therethrough, said blade being in the form of a narrow strip disposed edgewise toward the underside of the head; a drive shaft; means for coupling said blade to said drive shaft for rotation therewith, said means comprising an open ended coupler, one end of which sleeves said shaft, the opposite end having a diametrical slot for receiving and supporting said blade and maintaining the blade in the desired edgewise position relative to the head; means carried by said blade for holding the same against movement laterally of the shaft but permitting movement of the blade longitudinally thereof; and means carried by the slotted end of said coupler for yieldingly urging the blade longitudinally of the shaft and the shearing surfaces thereof against the underside of the head.

6. In a shaving machine comprising, a head having a series of radial, narrow and closely spaced hair-receiving slots extending therethrough; a rotatable blade having shearing surfaces in contact with the undersurface of the head and cooperating with the interior edges of the walls of the slots to shear off hair extending therethrough, said blade being in the form of a narrow strip disposed edgewise toward the underside of the head; a drive shaft; means for removably coupling said blade to said drive shaft for rotation therewith, said means comprising an open ended coupler of insulating material, one end of which sleeves said shaft, the opposite end having a diametrical slot for receiving and supporting said blade and maintaining the blade in the desired edgewise position relative to the head; means carried by said blade cooperable with means formed on said coupler for holding the blade against movement laterally of the shaft but permitting pivotal movement of the blade about an axis transverse to the shaft, said means permitting said blade a limited movement axially of said coupler; and means carried by the slotted end of said coupler for yieldingly urging the blade axially of the coupler whereby the shearing surfaces thereof are held yieldingly against the underside of the head.

GUSTAVE F. BAHR.